United States Patent
Choi

(10) Patent No.: US 9,852,553 B2
(45) Date of Patent: Dec. 26, 2017

(54) APPARATUS AND METHOD OF REQUESTING EMERGENCY CALL FOR VEHICLE ACCIDENT BY USING TRAVELLING INFORMATION ABOUT VEHICLE

(71) Applicant: HYUNDAI MOBIS CO., LTD., Seoul (KR)

(72) Inventor: Jin Young Choi, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 101 days.

(21) Appl. No.: 14/593,783

(22) Filed: Jan. 9, 2015

(65) Prior Publication Data
US 2015/0348337 A1   Dec. 3, 2015

(30) Foreign Application Priority Data

May 30, 2014   (KR) .................. 10-2014-0065603

(51) Int. Cl.
G07C 5/00   (2006.01)
G07C 5/08   (2006.01)
(Continued)

(52) U.S. Cl.
CPC ............... G07C 5/008 (2013.01); G07C 5/08 (2013.01); B60R 21/013 (2013.01);
(Continued)

(58) Field of Classification Search
CPC ...... G07C 5/008; H04W 76/007; H04W 4/22; H04W 4/046; H04W 60/04; H04W 4/02; H04W 4/025; H04W 4/027; B60R 21/013; B60R 21/0132; B60R 21/0134; B60R 2021/0027; B60R 21/01322; B60R 21/0136; H04M 3/5116; H04M 3/5125;
(Continued)

(56) References Cited

U.S. PATENT DOCUMENTS 4,709,776 A * 12/1987  Metz ...................... E05B 77/48
                                                    180/281
6,076,028 A *  6/2000  Donnelly .............. B60R 21/013
                                                    701/45
(Continued)

FOREIGN PATENT DOCUMENTS

KR    10-2006-0021135 A     3/2006
WO    WO 2013128346 A1 *  9/2013 ............. B60N 2/002

Primary Examiner — Thomas G Black
Assistant Examiner — Sara J Lewandroski

(57) ABSTRACT

Disclosed are an apparatus and a method of requesting an emergency call (E-Call) for a vehicle accident, which request an E-Call for a vehicle accident by using driving information obtained during travelling of a vehicle. An apparatus for requesting an E-Call for a vehicle accident according to the present invention includes: a travelling information detecting unit configured to detect travelling information about a vehicle for each predetermined time; a vehicle accident determining unit configured to determine whether an accident occurs in the vehicle based on the travelling information; and an E-Call signal transmitting unit configured to transmit an E-Call signal for the vehicle accident with a current location of the vehicle when it is determined that the accident occurs in the vehicle.

15 Claims, 7 Drawing Sheets

(51) Int. Cl.
   *H04M 1/725* (2006.01)
   *B60R 21/0132* (2006.01)
   *B60R 21/013* (2006.01)
   *B60R 21/00* (2006.01)
   *H04W 60/04* (2009.01)
   *H04W 4/04* (2009.01)

(52) U.S. Cl.
   CPC ... *B60R 21/0132* (2013.01); *B60R 2021/0027* (2013.01); *H04M 1/72536* (2013.01); *H04M 1/72538* (2013.01); *H04W 4/046* (2013.01); *H04W 60/04* (2013.01)

(58) Field of Classification Search
   CPC ............. H04M 3/527; H04M 1/72536; H04M 1/72538; G08G 1/127; G08B 25/00; G08B 25/016; G08B 25/009; G08B 25/10
   See application file for complete search history.

(56) References Cited

U.S. PATENT DOCUMENTS

| | | | | |
|---|---|---|---|---|
| 6,267,194 B1* | 7/2001 | Bullinger | ................. | B60T 7/22 180/275 |
| 6,339,370 B1* | 1/2002 | Ruhl | ................. | G08G 1/205 340/435 |
| 6,618,657 B1* | 9/2003 | Geil | ................. | G08G 1/205 340/436 |
| 7,064,456 B2* | 6/2006 | Hirota | ................. | E05L 377/12 180/274 |
| 7,124,852 B2* | 10/2006 | Hasegawa | ........... | B60R 21/0132 180/282 |
| 7,348,895 B2* | 3/2008 | Lagassey | ................ | G07C 5/008 340/907 |
| 2002/0169535 A1* | 11/2002 | Imai | .................... | B60R 21/0132 701/45 |
| 2004/0007860 A1* | 1/2004 | Miyata | ................. | B60R 21/013 280/735 |
| 2005/0128062 A1* | 6/2005 | Lundsgaard | ........... | G08G 1/205 340/436 |
| 2006/0273559 A1* | 12/2006 | Uono | ................. | B60R 21/0132 280/735 |
| 2009/0045928 A1* | 2/2009 | Rao | ........................ | B60Q 9/006 340/435 |
| 2010/0114445 A1* | 5/2010 | Groult | ...................... | B60T 7/22 701/70 |
| 2011/0279263 A1* | 11/2011 | Rodkey | ................. | G08B 25/016 340/539.13 |
| 2013/0054103 A1* | 2/2013 | Herink | ..................... | B60T 7/22 701/65 |
| 2013/0179042 A1* | 7/2013 | Katz | ................. | B60R 21/0132 701/46 |
| 2013/0332026 A1* | 12/2013 | McKown | ............... | H04W 4/22 701/33.7 |
| 2014/0024494 A1* | 1/2014 | Inoue | .................... | B60W 10/11 477/94 |
| 2015/0307048 A1* | 10/2015 | Santora | ................. | G08G 1/205 348/148 |
| 2016/0052473 A1* | 2/2016 | Debenham | ......... | B60R 21/0132 701/46 |
| 2016/0312886 A1* | 10/2016 | Park | .................... | F16H 61/0204 |

* cited by examiner

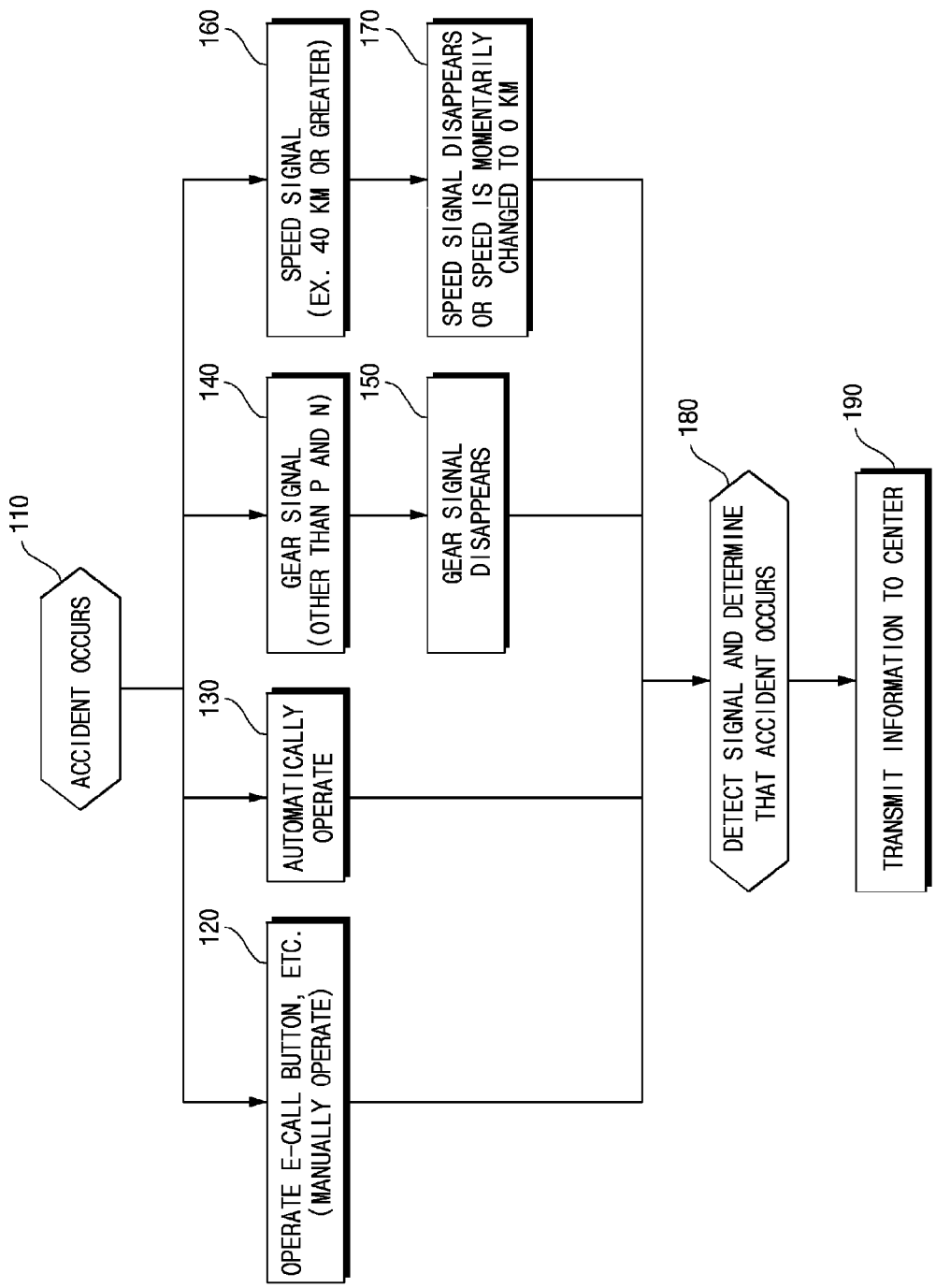
[FIG. 1]

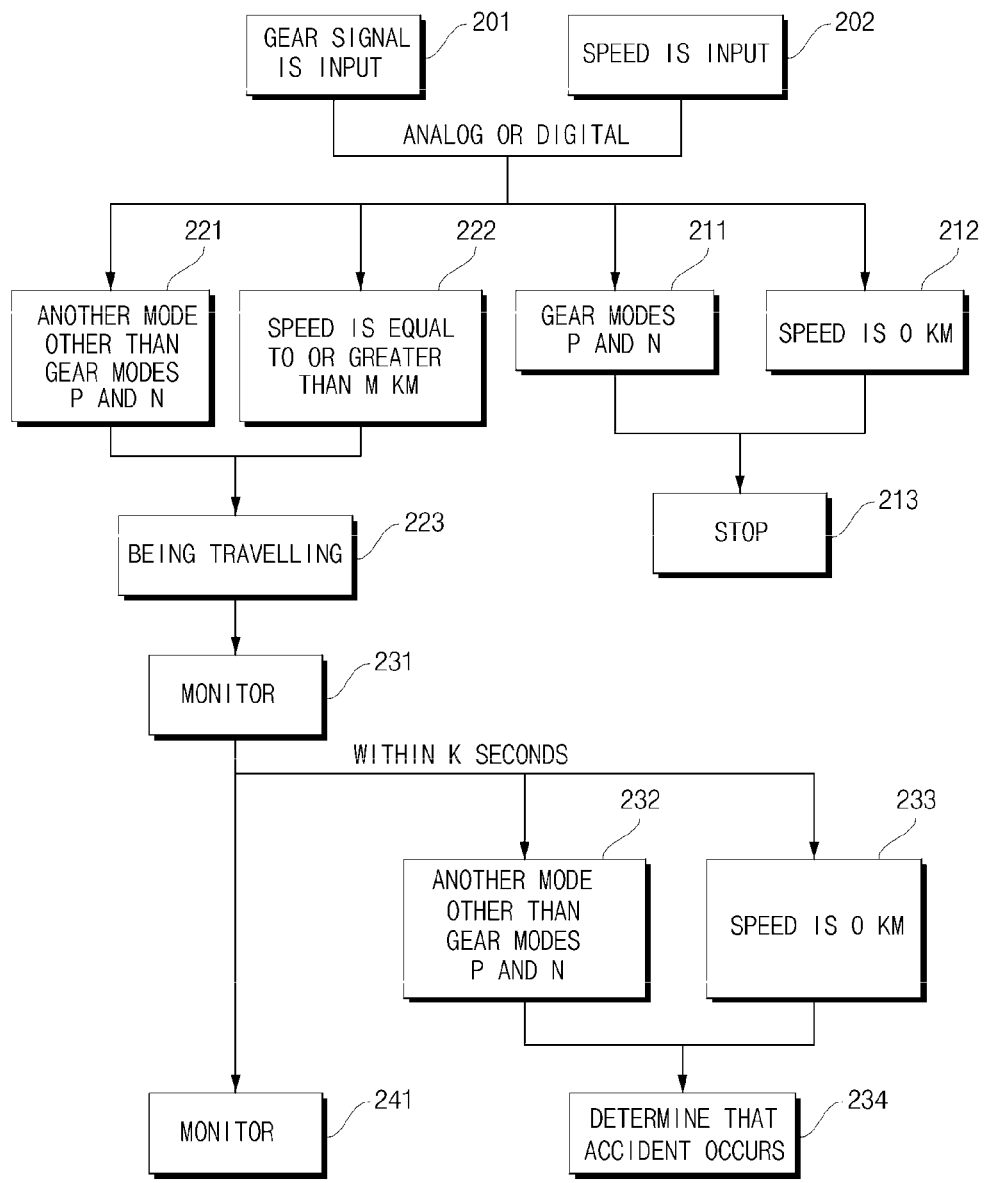
[FIG. 2]

[FIG. 3]
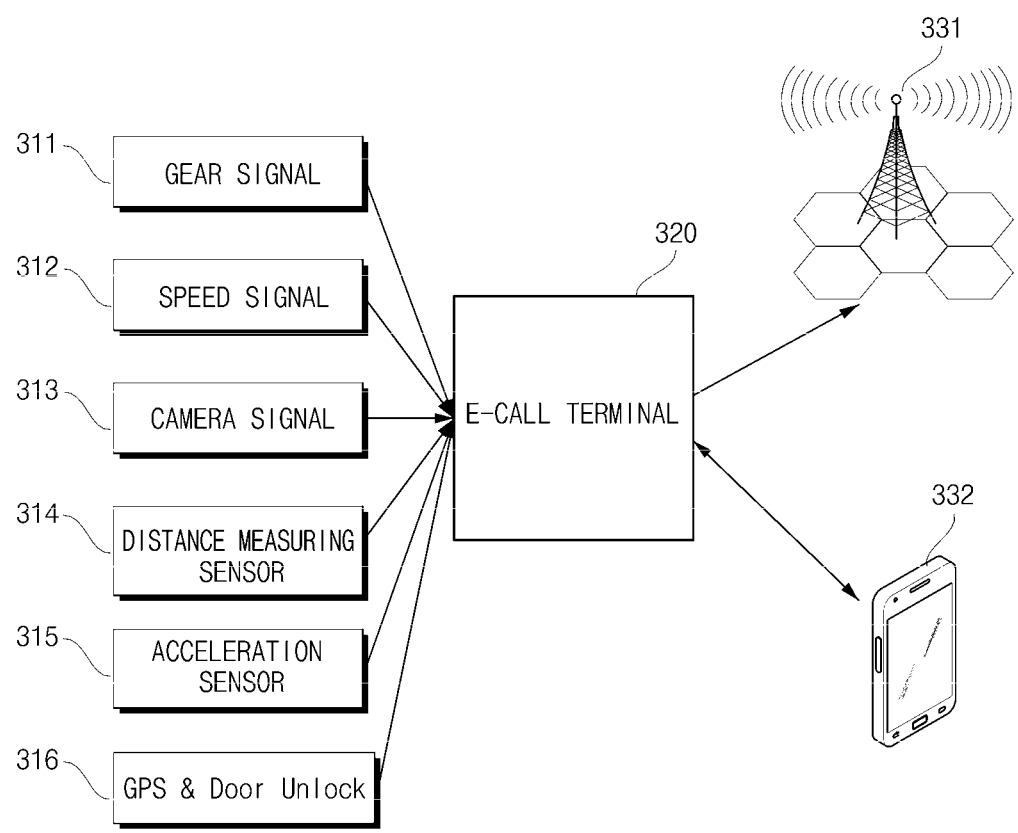

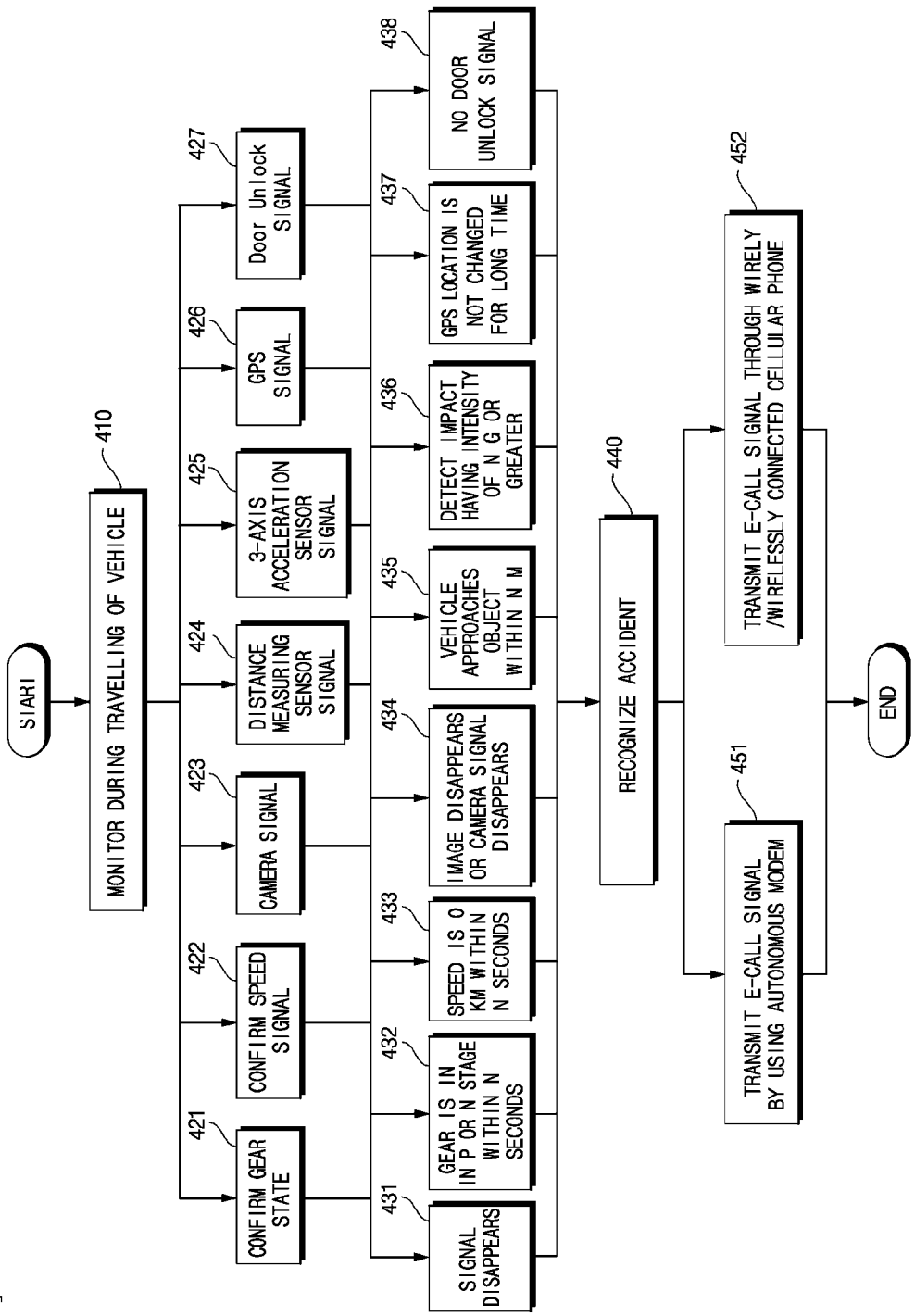
[FIG. 4]

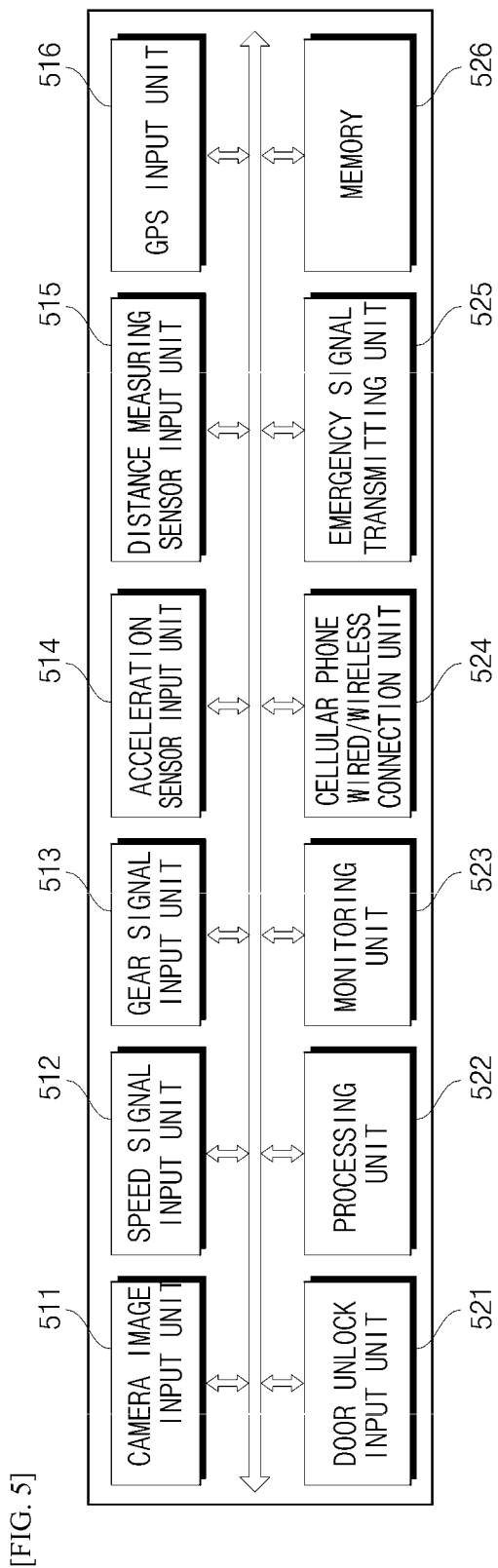

[FIG. 6]
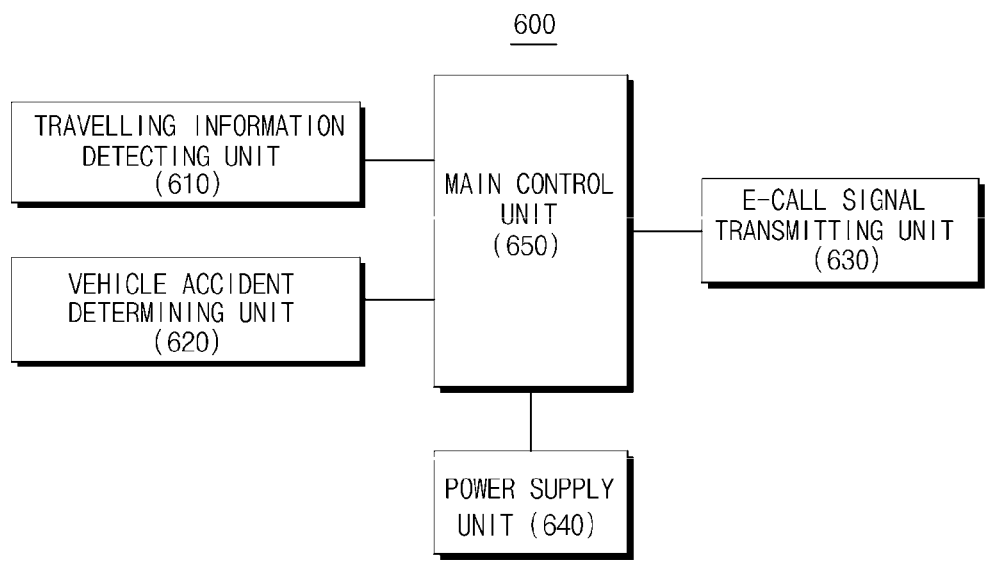
[FIG. 7]
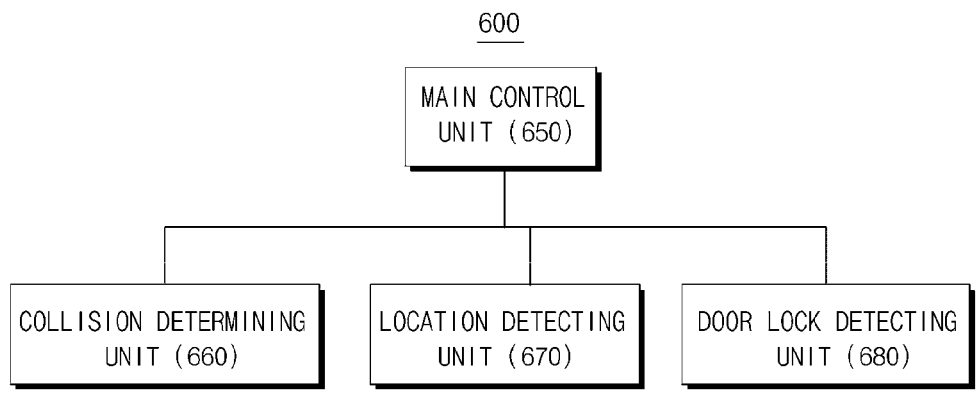

[FIG. 8]
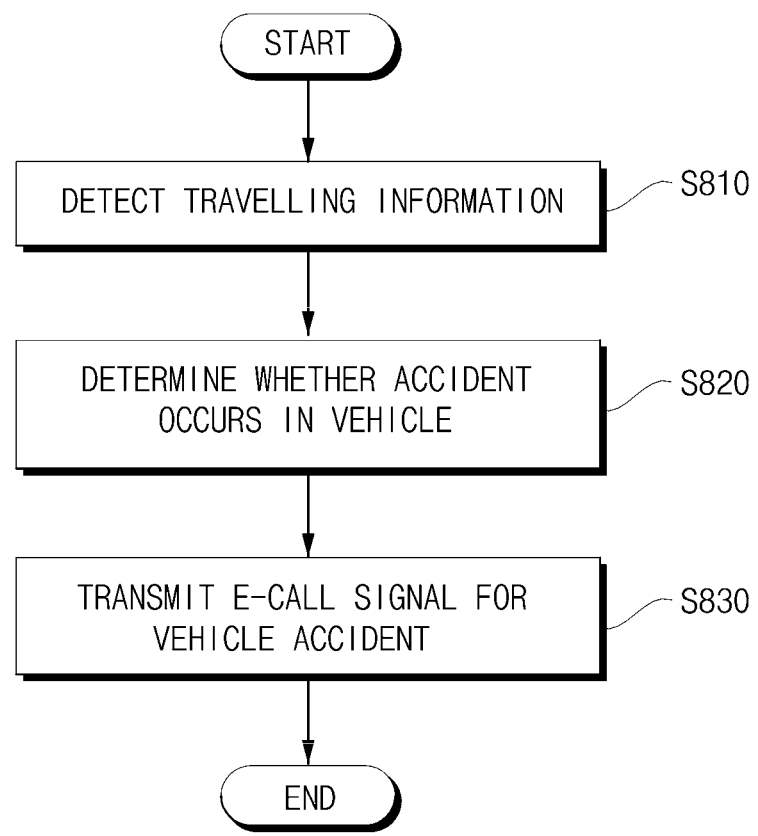

APPARATUS AND METHOD OF REQUESTING EMERGENCY CALL FOR VEHICLE ACCIDENT BY USING TRAVELLING INFORMATION ABOUT VEHICLE

CROSS-REFERENCE TO RELATED APPLICATIONS

This application claims priority to and the benefit of Korean Patent Application No. 10-2014-0065603 filed in the Korean Intellectual Property Office on May 30, 2014, the entire contents of which are incorporated herein by reference.

TECHNICAL FIELD

The present invention relates to an apparatus and a method of requesting an emergency call (E-Call) for a vehicle accident. More particularly, the present invention relates to an apparatus and a method of requesting an E-Call for a vehicle accident with a current location of a vehicle.

BACKGROUND ART

In Europe, regulation of an emergency call (E-Call) has been carried forward, so that an E-Call module has been compulsorily mounted in a currently produced vehicle.

When an emergency rescue button is input by a driver or an airbag development is detected, the E-Call module in the related art determines that a vehicle accident occurs, and transmits information, such as a current location of a vehicle or an accident situation, to a center.

However, when a vehicle accident occurs, there are many situations where it is impossible to input the emergency rescue button due to loss of consciousness by a driver and the like, and there is a case where the airbag is not properly developed. In this case, there is a problem in that it is impossible to request an emergency rescue from a center even a vehicle accident occurs.

Korean Patent Application Laid-Open No. 2006-0021135 suggests a system for transmitting an emergency call signal for a vehicle accident. The system recognizes a vehicle accident by using an engine problem detecting sensor and a sudden brake detecting sensor, and transmits an emergency call signal to a center, but there are many cases where the sensors are not properly operated when a vehicle accident occurs, so that the system cannot solve the aforementioned problem.

SUMMARY OF THE INVENTION

The present invention has been made in an effort to provide an apparatus and a method of requesting an emergency call for a vehicle accident, which request an emergency call for a vehicle accident by using travelling information obtained during travelling of a vehicle.

However, an object of the present invention is not limited to the aforementioned matters, and those skilled in the art will clearly understand non-mentioned other objects through the following description.

An exemplary embodiment of the present invention provides an apparatus for requesting an E-Call for a vehicle accident, including: a travelling information detecting unit configured to detect travelling information about a vehicle for each predetermined time; a vehicle accident determining unit configured to determine whether an accident occurs in the vehicle based on the travelling information; and an E-Call signal transmitting unit configured to transmit an E-Call signal for the vehicle accident with a current location of the vehicle when it is determined that the accident occurs in the vehicle.

The travelling information detecting unit may detect information on a gear state of a transmission mounted in the vehicle or a current speed of the vehicle as the travelling information.

When the information on the gear state represents another mode, except for a parking (P) mode and a neutral (N) mode, the current speed is equal to or smaller than a first reference speed, or the information on the gear state or the current speed is not detected, the vehicle accident determining unit may determine that the accident occurs in the vehicle.

The travelling information detecting unit may detect a current time, at which the current speed is detected, together, and when the current speed is 0, a difference value between a previous speed and the current speed is equal to or greater than a first reference value, and a difference value between a previous time, which is detected together with the previous speed, and the current time is equal to or smaller than a second reference value, the vehicle accident determining unit may determine that the accident occurs in the vehicle.

The vehicle accident determining unit may be operated when the information on the gear state represents another mode, except for the P mode and the N mode, and the current speed is equal to or greater than a second reference speed.

The apparatus may further include a collision determining unit configured to determine whether the vehicle collides with an object located outside the vehicle, in which the vehicle accident determining unit may determine whether the accident occurs in the vehicle according to whether the vehicle collides with the object.

The collision determining unit may determine whether the vehicle collides with the object by using at least one of a camera for photographing a front side of the vehicle, a radar for detecting the object at each side of the outside of the vehicle, and an acceleration sensor for measuring an acceleration of the vehicle.

In the case where the collision determining unit determines whether the vehicle collides with the object by using the camera, when a distance to the object in the image obtained by the camera is equal to or smaller than a first reference distance, an image is not obtained by the camera for a predetermined time, or a detection signal for the camera is not detected, the collision determining unit may determine that the vehicle collides with the object, in the case where the collision determining unit determines whether the vehicle collides with the object by using the radar, when a distance to the object obtained by the radar is equal to or smaller than a second reference distance, or a detection signal for the radar is not detected, the collision determining unit may determine that the vehicle collides with the object, and in the case where the collision determining unit determines whether the vehicle collides with the object by using the acceleration sensor, when an intensity of an impact measured by the acceleration sensor is equal to or greater than a reference intensity, the collision determining unit may determine that the vehicle collides with the object.

The apparatus may further include: a location detecting unit configured to detect a location of the vehicle and measure a time, at which the location is detected; and a door lock detecting unit configured to detect information on a door lock state of the vehicle, in which when a location of the vehicle detected at a previous time is equal to a location of the vehicle detected at a current time, and door lock release information about the vehicle is not detected at the previous time and the current time, the vehicle accident determining unit may determine that the accident occurs in the vehicle.

The E-Call signal transmitting unit may transmit the E-Call signal by using at least one of a first terminal, which is mounted in the vehicle and capable of transceiving data, a second terminal carried by a driver of the vehicle, and a third terminal, which is capable of transceiving data with the first terminal.

Another exemplary embodiment of the present invention provides a method of requesting an emergency call (E-Call) for a vehicle accident, including: detecting travelling information about a vehicle for each predetermined time; determining whether an accident occurs in the vehicle based on the travelling information; and transmitting an E-Call signal for the vehicle accident with a current location of the vehicle when it is determined that the accident occurs in the vehicle.

The detecting of the travelling information may include detecting information on a gear state of a transmission mounted in the vehicle or a current speed of the vehicle as the travelling information.

The determining whether the accident occurs in the vehicle may include determining that the accident occurs in the vehicle when the information on the gear state represents another mode, except for a parking (P) mode and a neutral (N) mode, the current speed is equal to or smaller than a first reference speed, or the information on the gear state or the current speed is not detected.

The detecting of the travelling information may include detecting a current time together when the current speed is detected, and the determining whether the accident occurs in the vehicle includes determining that the accident occurs in the vehicle when the current speed is 0, a difference value between a previous speed and the current speed is equal to or greater than a first reference value, and a difference value between a previous time, which is detected together with the previous speed, and the current time is equal to or smaller than a second reference value.

The determining whether the accident occurs in the vehicle may be performed when the information on the gear state represents another mode, except for the P mode and the N mode, and the current speed is equal to or greater than a second reference speed.

The method may further include determining whether the vehicle collides with an object located outside the vehicle as an operation simultaneously performed with the detecting of the travelling information, and the determining whether the accident occurs in the vehicle includes determining whether the accident occurs in the vehicle according to whether the vehicle collides with the object.

The determining whether the vehicle collides with the object is performed by using at least one of a camera for photographing a front side of the vehicle, a radar for detecting the object at each side of the outside of the vehicle, and an acceleration sensor for measuring an acceleration of the vehicle.

The determining whether the vehicle collides with the object may include, in the case where it is determined whether the vehicle collides with the object by using the camera, when a distance to the object in the image obtained by the camera is equal to or smaller than a first reference distance, an image is not obtained by the camera for a predetermined time, or a detection signal for the camera is not detected, determining that the vehicle collides with the object, in the case where it is determined whether the vehicle collides with the object by using the radar, when a distance to the object obtained by the radar is equal to or smaller than a second reference distance, or a detection signal for the radar is not detected, determining that the vehicle collides with the object, and in the case where it is determined whether the vehicle collides with the object by using the acceleration sensor, when an intensity of an impact measured by the acceleration sensor is equal to or greater than a reference intensity, determining that the vehicle collides with the object.

The method may further include: detecting a location of the vehicle and measuring a time, at which the location is detected; and detecting information on a door lock state of the vehicle as operation simultaneously performed with the detecting of the travelling information, in which the determining whether the accident occurs in the vehicle includes when a location of the vehicle detected at a previous time is equal to a location of the vehicle detected at a current time, and door lock release information about the vehicle is not detected at the previous time and the current time, determining that the accident occurs in the vehicle.

The transmitting of the E-Call signal may include transmitting the E-Call signal by using at least one of a first terminal, which is mounted in the vehicle and capable of transceiving data, a second terminal carried by a driver of the vehicle, and a third terminal, which is capable of transceiving data with the first terminal.

According to the exemplary embodiments of the present invention, the present invention may obtain effects below by requesting an E-call for a vehicle accident by using travelling information obtained when a vehicle is travelled.

First, it is possible to improve recognition performance for a vehicle accident.

Second, it is possible to request an E-call for a vehicle accident in real time when a vehicle accident occurs.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a flowchart for describing an operation method of an E-Call system according to a first exemplary embodiment of the present invention.

FIG. 2 is a flowchart for describing an operation method of an E-Call system according to a second exemplary embodiment of the present invention.

FIG. 3 is a conceptual diagram illustrating an E-Call system according to a third exemplary embodiment of the present invention.

FIG. 4 is a flowchart illustrating an operation method of the E-Call system according to the third exemplary embodiment of the present invention.

FIG. 5 is a conceptual diagram illustrating an internal configuration of an E-Call terminal according to the third exemplary embodiment of the present invention.

FIG. 6 is a block diagram schematically illustrating an apparatus for requesting an E-Call for a vehicle accident according to an exemplary embodiment of the present invention.

FIG. 7 is a block diagram illustrating a configuration added to the apparatus for requesting an E-Call for a vehicle accident of FIG. 6.

FIG. 8 is a flowchart schematically illustrating a method of requesting an E-Call for a vehicle accident according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in addition of reference numerals to constituent elements of each drawing, it should be noted that like reference numerals are used for like and corresponding parts even though the parts are illustrated in the different drawings. In the following description of the exemplary embodiment, a detailed description of known configurations or functions incorporated herein will be omitted when it is determined that the detailed description may make the subject matter of the present invention unclear. An exemplary embodiment of the present invention will be described below, but the technical spirit of the present invention is not limited thereto and may be modified and variously implemented by those skilled in the art.

The present invention relates to an apparatus and a method of improving accuracy for recognition of a vehicle accident situation in an emergency call (E-Call) system.

FIG. 1 is a flowchart for describing an operation method of an E-Call system according to a first exemplary embodiment of the present invention.

An E-Call system (hereinafter, a "first E-Call system) according to a first exemplary embodiment of the present invention may more accurately recognize an accident condition by reflecting vehicle speed information and transmission information to an E-Call function in the related art, and smoothly request an E-Call from a center even in a situation where a driver loses his/her consciousness or an airbag is not developed.

Hereinafter, the present exemplary embodiment will be described in detail with reference to FIG. 1.

In the case where a vehicle is being operated, gear information represents a situation where a gear is in remaining modes, such as a driving (D) mode, a reverse (R) mode, a first-stage mode, a second-stage mode, and a third-stage mode, other than a parking (P) mode and a neutral (N) mode, and a speed is equal to or greater than 0 Km.

Accordingly, the first E-Call system checks gear information and a speed signal, and recognizes the case where a gear signal or the speed signal is not suddenly input, or the speed signal is dropped to 0 Km when the vehicle travels at a specific speed or greater as an accident.

The first E-Call system is configured by a logic 140 capable of recognizing a current state of a gear and a logic 160 capable of recognizing a current speed of a vehicle, in addition to an existing signal, such as a button operation 120 by a driver and an airbag development signal 130, for recognizing occurrence of an accident.

For an operation of the vehicle, a gear needs to be changed to have any one mode among a driving (D) mode, a reverse (R) mode, a first-stage mode, a second-stage mode, and a third-stage mode. When the vehicle is being operated, a speed signal of 0 Km or greater accident occurs.

The first E-Call system monitors the existing signals 120 and 130, and the gear state 140 and the speed information 160 of the currently operated vehicle. When the gear signal disappears (150), the speed signal disappears or the speed is momentarily changed to 0 Km, the first E-Call system recognizes that a vehicle accident occurs (180). Then, the first E-Call system transmits an E-call signal including information on a current location of the vehicle to the center (190).

The aforementioned first E-Call system monitors the gear and the vehicle speed, and determines the case where the gear signal and the vehicle speed are sharply reduced within a specific time or the signal disappears as an accident, apart from the case where the driver directly operates an E-Call switch or an airbag development is considered as an accident recognition time which is the existing method for recognizing an accident. That is, the first E-Call system determines a vehicle accident by using any one signal of the gear signal and the speed signal. However, in the present invention, it is also possible to determine a vehicle accident by using both the gear signal and the speed signal.

FIG. 2 is a flowchart for describing an operation method of an E-Call system according to a second exemplary embodiment of the present invention.

When a gear signal and a speed signal is input as an analog signal or a digital signal (201 and 202), an E-Call system, that is, a second E-Call system, according to a second exemplary embodiment of the present invention detects a current state of a gear of a vehicle from the gear signal, and detects a current speed of the vehicle from the speed signal.

When the current state of the gear of the vehicle is any one of the P mode and the N mode (211), and the current speed of the vehicle is 0 Km (212), the second E-Call system determines that the vehicle stops (213). However, when the current state of the gear of the vehicle is any one of the remaining modes, except for the P mode and the N mode (221), and the current speed of the vehicle is M Km more (222), the second E-Call system determines that the vehicle is travelling (223).

When it is determined that the vehicle is travelling, the second E-Call system monitors the gear speed and the speed signal thereafter (231).

When the current state of the gear of the vehicle is a mode other than the P mode and the N mode (232), or the gear signal disappears, and the current speed of the vehicle is 0 Km (233) after a predetermined time, (for example, K seconds), the second E-Call system determines that a vehicle accident occurs (234). For other conditions, the second E-Call system determines that a vehicle accident does not occur, and continuously monitors the gear signal and the speed signal until the vehicle stops (241).

In the present exemplary embodiment, the time for detecting the speed signal (M Km) and the change in a travelling condition is not specified, and the time (K seconds) for the accident determination may be changed separately from the speed signal.

FIG. 3 is a conceptual diagram illustrating an E-Call system according to a third exemplary embodiment of the present invention.

FIG. 3 is an example for an E-Call system, that is, a third E-Call system, according to a third exemplary embodiment of the present invention, and illustrates illustrative contents of the case where, when there is no existing E-Call function (for example, there is no E-Call button inputtable by a driver), an E-Call terminal 320 monitors a vehicle signal, recognizes an accident, and transmits an emergency signal.

All components including a transmission mode are commonly called the E-Call terminal 320. An internal configuration of the E-Call terminal 320 will be described in detail with reference to FIG. 5 below.

In the meantime, a gear signal 311 for a current state of a gear, a speed signal 312 for a current speed of a vehicle, a camera image signal 313 obtained by photographing a front side of the vehicle, a distance 314 to an object outside the vehicle obtained by a distance measuring sensor, an intensity 315 of impact applied to the vehicle obtained by an acceleration sensor, a GPS signal for a current location of the vehicle, a door unlock signal 316 for a lock stage of a door of the vehicle, and the like include both an analog scheme and a digital scheme.

A transmission scheme includes all of a scheme 331 using a modem within the terminal and a scheme 332 using a wirely/wirelessly connected mobile terminal A communication scheme between the E-Call terminal 320 and a mobile terminal includes all of a universal serial bus (USB), media healthy literacy (MHL) high definition multimedia interface (HDMI), Bluetooth (BT), wireless fidelity (Wi-Fi), near field communication (NFC), and the like.

FIG. 4 is a flowchart illustrating an operation method of the E-Call system according to the third exemplary embodiment of the present invention.

As described above, the E-Call terminal 320 may monitor an operation of the vehicle by using the gear state, the speed signal, the camera signal, distance information obtained by the distance measuring sensor, impact intensity information obtained by the acceleration sensor, the GPS signal, the door unlock signal, and the like, and may monitor the operation of the vehicle by other methods.

The E-Call terminal 320 may recognize that the vehicle stops or is in an accident state by detecting a change in the gear state and a state of the speed signal, the camera signal, the acceleration sensor, the GPS signal, and the door unlock signal during the monitoring of the operation of the vehicle. The recognition of the accident state will be described in detail with reference to FIG. 4 below.

FIG. 4 illustrates a flow of detecting and monitoring a signal, and recognizing an accident by the E-Call terminal 320 after a start of an operation of the vehicle. For simplification, the whole functions are not illustrated, and only necessary functional parts for the present patent are illustrated.

When the gear is in the P mode or the N mode, and the speed signal is 0 Km, the third E-Call system recognizes that the vehicle stops, and when the gear is in another mode, except for the P mode or the N mode, and the speed signal is N Km or greater, the third E-Call system recognizes that the vehicle is travelling. When it is recognized that the vehicle is travelling, the E-Call terminal 320 starts to perform a monitoring function (410).

The E-Call terminal 320 monitors the gear state and the speed signal in the travelling state of the vehicle (421 and 422), and when the gear is in the P or N mode after the speed signal is decreased to a time of n seconds and becomes 0 Km (432), the E-Call terminal 320 determines that the vehicle stops. In the meantime, when the speed signal is decreased for a time equal to or shorter than n seconds to be 0 Km (433), the speed signal disappears, the gear state is changed to be in the P or N mode for a time equal to or shorter than n seconds in the state where the speed signal is N Km or greater, or the gear state is not detected (431), the E-Call terminal 320 is switched to be in an accident recognition state (440).

The E-Call terminal 320 recognizes a recognized object by monitoring a screen of a camera of the vehicle in the travelling situation (423), processes a distance with the object, and determines that the object approaches the vehicle within a distance determined as a vehicle collision state, and then when a camera image signal disappears, or a camera detection signal disappears, so that it is determined that the camera is broken (434), the E-Call terminal 320 is switched to be in the accident recognition state (440).

The E-Call terminal 320 recognizes a distance to an object by monitoring the distance measuring sensor in the travelling situation (424), processes the distance to the object, and determines that the object approaches the vehicle within a distance determined as a vehicle collision state, and then when a signal of the distance measuring sensor disappears, or a detection signal of the distance measuring sensor disappears, so that it is determined that the distance measuring sensor is broken (435), the E-Call terminal 320 is switched to be in the accident recognition state (440).

The E-Call terminal 320 monitors the acceleration sensor in the stop or travelling situation (425), and when an impact equal to or greater than a specific impact is detected (436), the E-Call terminal 320 is switched to be in the accident recognition state (440).

The E-Call terminal 320 monitors the GPS signal and the door unlock signal (426 and 427) after the vehicle is changed from the travelling situation to the stop situation, and when the GPS signal is located at the same point for a long time (437) and the door unlock signal is not detected (438), the E-Call terminal 320 is switched to be in the accident recognition state (440).

The accident recognition state includes all of the cases where the respective functions are dependently operated or complexly operated.

The E-Call terminal 320 transmits an emergency signal after the recognition of the accident. The E-Call terminal 320 may transmit the emergency signal by using a scheme 451 through an autonomous modem, or a scheme 452 using a wirely/wirelessly connected cellular phone. The transmission methods of the E-Call terminal 320 may be independently used or simultaneously used.

FIG. 5 is a conceptual diagram illustrating an internal configuration of the E-Call terminal according to the third exemplary embodiment of the present invention.

FIG. 5 is a schematic diagram of one aspect of the E-Call terminal 320.

According to FIG. 5, the E-Call terminal 320 includes a camera image input unit 511, a speed signal input unit 512, a gear signal input unit 315, an acceleration sensor input unit 514, a distance measuring sensor input unit 515, a GPS input unit 516, a door unlock input unit 521, a processing unit 522, a monitoring unit 523, a cellular phone wire/wireless connection unit 524, an emergency signal transmitting unit 525, and a memory unit 526.

The camera image input unit 511 is an image recording device for photographing a front side of the vehicle, obtaining an image of the front side, and performing a black box function. The camera image input unit 511 may also perform a function of processing an image photographed by the camera.

The GPS input unit 516 includes a GPS module for collecting location information about the vehicle, and a coordinate extracting unit for extracting an actual coordinate value from the location information. The GPS input unit 516 may provide latitude and longitude data as the location information about the vehicle on a map to the processing unit 522.

The acceleration sensor input unit 514 may perform a function of detecting an impact applied to a front camera, a microphone, the vehicle, and the like, as an acceleration, and further detecting an inclination of the vehicle.

The monitoring unit 523 is configured by a circuit and software for monitoring a signal of each of the input units 511 to 521.

The processing unit 522 is a unit for determining a result of the monitoring by the monitoring unit 523, that is, whether an accident of the vehicle occurs. For example, when the front camera signal is cut and is not input or the image of the recognized object image disappears, the processing unit 522 may determine that the accident occurs.

The memory unit 526 is a configuration for processing and storage.

The emergency signal transmitting unit 525 is a configuration for transmitting the result of the accident determination for the vehicle together with the location information about the vehicle. The emergency signal transmitting unit 525 performs a vehicle control function of transmitting data while wirelessly communicating a remotely located external control center server through a mobile communication network.

The cellular phone wire/wireless connection unit 524 is a configuration of transmitting the result of the accident determination for the vehicle together with the emergency signal transmitting unit 525, and may be driven when the emergency signal transmitting unit 525 cannot be normally operated.

The various exemplary embodiments of the present invention have been described above with reference to FIGS. 1 to 5. Hereinafter, preferable forms of the present invention conceivable from the various exemplary embodiments will be described. FIG. 6 is a block diagram schematically illustrating an apparatus for requesting an E-Call for a vehicle accident according to an exemplary embodiment of the present invention. FIG. 7 is a block diagram illustrating a configuration added to the apparatus for requesting an E-Call for a vehicle accident of FIG. 6.

According to FIG. 6, an apparatus 600 for requesting an E-Call for a vehicle accident includes a travelling information detecting unit 610, a vehicle accident determining unit 620, an E-Call signal transmitting unit 630, a power supply unit 640, and a main control unit 650.

The power supply unit 640 performs a function of supplying power to each component of the apparatus 600 for requesting the E-Call for the vehicle accident. The main control unit 650 performs a function of controlling an entire operation of each component of the apparatus 600 for requesting the E-Call for the vehicle accident. Considering that the apparatus 600 for requesting the E-Call for the vehicle accident is mounted in the vehicle and is controllable by an electronic control unit (ECU), the power supply unit 640 and the main control unit 650 may not be included in the present exemplary embodiment.

The travelling information detecting unit 610 performs a function of detecting travelling information about the vehicle for each predetermined time. In the present exemplary embodiment, the travelling information is a concept collectively including various information related to the travelling of the vehicle, information on operation stages of various devices mounted in the vehicle, and the like.

The traveling information detecting unit 610 may detect information on a gear state of a transmission mounted in the vehicle or a current speed of the vehicle as the travelling information.

The vehicle accident determining unit 620 performs a function of determining whether an accident of the vehicle occurs based on the traveling information about the vehicle.

When the information on the gear state represents another mode, except for the P mode and the N mode, and the current speed is equal to or smaller than a first reference speed, the vehicle accident determining unit 620 may determine that an accident of the vehicle occurs. When the information on the gear state or the current speed is not detected, the vehicle accident determining unit 620 may determine that an accident of the vehicle occurs. The first reference speed may be, for example, 0.

In the meantime, considering the case where the speed is momentarily changed to 0 Km, the traveling information detecting unit 610 and the vehicle accident determining unit 620 may be driven as described above.

That is, when the travelling information detecting unit 610 detects the current speed, the travelling information detecting unit 610 may detect a current time together. When the current speed is 0, a difference value between a previous speed and the current speed is equal to or greater than a first reference value, and a difference value between a previous time, which is detected together with the previous speed, and a current time is equal to or smaller than a second reference value, the vehicle accident determining unit 620 may determine that an accident occurs in the vehicle.

In the meantime, when the information on the gear state represents another mode, except for the P mode and the N mode, and the current speed is equal to or greater than a second reference speed, the vehicle accident determining unit 620 may be operated. In this case, the second reference speed may be, for example, 0.

When it is determined that the accident occurs in the vehicle, the E-Call signal transmitting unit 630 performs a function of transmitting an E-Call signal for the vehicle accident with the current location of the vehicle.

The E-Call signal transmitting unit 630 may transmit the E-Call signal by using at least one of a first terminal, which is mounted in a vehicle and capable of transceiving data, a second terminal carried by a driver of the vehicle, and a third terminal, which is capable of transceiving data with the first terminal. The second terminal carried by the driver is, for example, a terminal possessed by the driver of the corresponding vehicle, and may use a terminal registered in a server of a police agency, a traffic control center, or the like.

The apparatus 600 for requesting the E-Call for the vehicle accident may further include a collision determining unit 660 as illustrated in FIG. 7.

The collision determining unit 660 performs a function of determining whether the vehicle collides with an object located outside the vehicle. In this case, the vehicle accident determining unit 620 may determine whether a vehicle accident occurs according to whether the vehicle collides with the object. When it is determined that the vehicle collides with the object, the vehicle accident determining unit 620 determines that an accident occurs in the vehicle.

The collision determining unit 660 may determine whether the vehicle collides with the object by using at least one of a camera for photographing the front side of the vehicle, a radar for detecting an object at each side of the outside of the vehicle, and the acceleration sensor for measuring an acceleration of the vehicle.

In the case where the collision determining unit 660 determines whether the vehicle collides with the object by using the camera, when a distance to the object in an image obtained by the camera is equal to or smaller than a first reference distance, an image is not obtained by the camera for a predetermined time, or a detection signal for the camera is not detected, the collision determining unit 660 may determine that the vehicle collides with the object.

In the case where the collision determining unit 660 determines whether the vehicle collides with the object by using the radar, when a distance to the object obtained by the radar is equal to or smaller than a second reference distance, or a detection signal for the radar is not detected, the collision determining unit 660 may determine that the vehicle collides with the object.

In the case where the collision determining unit 660 determines whether the vehicle collides with the object by using the acceleration sensor, when an intensity of an impact measured by the acceleration sensor is equal to or greater than a reference intensity, the collision determining unit 660 may determine that the vehicle collides with the object.

The apparatus 600 for requesting the E-Call for the vehicle accident may further include a location detecting unit 670 and a door lock detecting unit 680.

The location detecting unit 670 may perform a function of detecting a location of the vehicle, and measuring a time at which the location is detected.

The door lock detecting unit 680 performs a function of detecting information on a door lock state of the vehicle.

In the aforementioned case, when a location of the vehicle detected at a previous time is equal to a location of the vehicle detected at a current time, and door lock release information about the vehicle is not detected for a predetermined time between the previous time and the current time, the vehicle accident determining unit 620 may determine that an accident occurs in the vehicle.

Next, an operation method of the apparatus 600 for requesting the E-Call for the vehicle accident will be described. FIG. 8 is a flowchart schematically illustrating a method of requesting an E-Call for a vehicle accident according to an exemplary embodiment of the present invention. The method of requesting an E-Call for a vehicle accident will be described with reference to FIGS. 6 and 8.

First, the travelling information detecting unit 610 detects travelling information about a vehicle for each predetermined time (S810).

Then, the vehicle accident determining unit 620 determines whether a vehicle accident occurs based on the travelling information (S820).

When it is determined that the accident occurs in the vehicle, the E-Call signal transmitting unit 630 transmits an E-Call signal for the vehicle accident with a current location of the vehicle (S830).

In the meantime, when operation S810 is performed, the collision determining unit 660 may determine whether the vehicle collides with an object located outside the vehicle (A). Operation S820 may be performed according to a result of the determination of operation A. Operation A may be performed before operation S810, or between operation S810 and operation S820.

In the meantime, when operation S810 is performed, the location detecting unit 670 may detect a location of the vehicle, and measure a time, at which the location is detected (B). The door lock detecting unit 680 may detect information on a door lock state of the vehicle (C). Operation S820 may be performed according to a result of the determination of operation B and operation C. Operations B and C may be performed before operation S810, or between operation S810 and operation S820. Operations B and C may be simultaneously performed, or any one of operations B and C may be first performed.

In the meantime, even if it is described that all of constituent elements constituting the aforementioned exemplary embodiment of the present invention are coupled as a single unit or coupled to be operated as a single unit, the present invention is not necessarily limited to the exemplary embodiment. That is, among the components, one or more constituent elements may be selectively coupled to be operated within the scope of the object of the present invention. Although each of the constituent elements may be implemented as an independent hardware, some or all of the constituent elements may be selectively combined with each other, so that they can be implemented as a computer program having a program module for executing some or all of the functions combined in one or a plurality of hardware. Such a computer program may be stored in a computer readable media such as a USB memory, a CD disk, or a flash memory to be read and executed by a computer to implement the exemplary embodiment of the present invention. The recording media of the computer program may include a magnetic recording medium, an optical recording medium, or a carrier wave medium.

All terms used herein including technical or scientific terms have the same meanings as meanings which are generally understood by those skilled in the art unless they are differently defined. Terms defined in generally used dictionary shall be construed that they have meanings matching those in the context of the related art, and shall not be construed in ideal or excessively formal meanings unless they are clearly defined in the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus comprising:
    a travelling information detecting unit configured to detect a previous speed at a previous time and a current speed at a current time as travelling information about a vehicle;
    a vehicle accident determining unit configured to determine whether an accident has occurred in the vehicle based on the travelling information; and
    an emergency call (E-Call) signal transmitting unit configured to transmit an E-Call signal for the vehicle accident with a current location of the vehicle when it is determined that the accident has occurred in the vehicle, wherein the vehicle accident determining unit is configured to determine that the accident has occurred in the vehicle if information on a gear state indicates a mode that is different from a parking (P) mode and a neutral (N) mode and the detected current speed of the vehicle is equal to or smaller than a first reference speed, and wherein the vehicle accident determining unit is further configured to determine that the accident has occurred in the vehicle when the detected current speed is 0, a difference value obtained from the detected previous speed and the detected current speed is equal to or greater than a first reference value, and a difference value between the previous time and the current time is equal to or smaller than a second reference value.

2. The apparatus of claim 1, wherein the travelling information detecting unit further detects the information on the gear state of a transmission mounted in the vehicle as the travelling information.

3. The apparatus of claim 2, wherein the vehicle accident determining unit is configured to determine that the accident has occurred in the vehicle if the information on the gear state or the current speed is not detected.

4. The apparatus of claim 2, wherein the vehicle accident determining unit operates when the information on the gear state indicates the mode different from the P mode and the N mode, and the current speed is equal to or greater than a second reference speed.

5. The apparatus of claim 1, wherein the difference value between the previous time and the current time is smaller than the second reference value.

6. The apparatus of claim 1, further comprising:
a collision determining unit configured to determine whether the vehicle has collided with an external object,
wherein the vehicle accident determining unit is further configured to determine whether the accident has occurred in the vehicle according to whether the vehicle has collided with the external object.

7. The apparatus of claim 6, wherein the collision determining unit determines whether the vehicle has collided with the external object by using at least one of a camera for photographing a front side of the vehicle, a radar for detecting the external object, and an acceleration sensor for measuring an acceleration of the vehicle.

8. The apparatus of claim 7,
wherein if the collision determining unit determines whether the vehicle has collided with the object by using the radar, when a distance to the object obtained by the radar is equal to or smaller than a reference distance or a detection signal for the radar is not detected, the collision determining unit determines that the vehicle has collided with the object.

9. The apparatus of claim 1, further comprising:
a location detecting unit configured to detect a location of the vehicle and measure a time at which the location is detected; and
a door lock detecting unit configured to detect information on a door lock state of the vehicle,
wherein when a first location of the vehicle detected at a first time is equal to a second location of the vehicle detected at a second time, and door lock release information about the vehicle is not detected for a time interval between the first time and the second time, the vehicle accident determining unit is configured to determine that the accident has occurred in the vehicle.

10. The apparatus of claim 1, wherein the E-Call signal transmitting unit transmits the E-Call signal by using at least one of a first terminal, which is mounted in the vehicle and capable of transceiving data, a second terminal carried by a driver of the vehicle, and a third terminal, which is capable of transceiving data with the first terminal.

11. A method comprising:
detecting travelling information about a vehicle;
determining whether an accident has occurred in the vehicle based on the travelling information; and
transmitting an emergency call (E-Call) signal for the vehicle accident with a current location of the vehicle when it is determined that the accident has occurred in the vehicle,
wherein the detecting of the travelling information includes detecting a previous speed at a previous time and a current speed at a current time, and
wherein the determining whether the accident has occurred in the vehicle includes:
determining that the accident has occurred if information on a gear state indicates a mode that is different from a parking (P) mode and a neutral (N) mode and the detected current speed of the vehicle is equal to or smaller than a first reference speed, and
determining that the accident has occurred in the vehicle when the detected current speed is 0, a difference value between the detected previous speed and the detected current speed is equal to or greater than a first reference value, and a difference value between the previous time and the current time is equal to or smaller than a second reference value.

12. The method of claim 11, wherein the detecting of the travelling information further includes detecting the information on the gear state of a transmission mounted in the vehicle as the travelling information.

13. The method of claim 11, further comprising:
determining whether the vehicle has collided with an external object,
wherein the determining whether the accident has occurred in the vehicle further includes determining whether the accident has occurred in the vehicle according to whether the vehicle has collided with the external object.

14. The method of claim 13, wherein whether the vehicle has collided with the external object is determined by using a radar, when a distance to the external object obtained by the radar is equal to or smaller than a reference distance or a detection signal for the radar is not detected.

15. The method of claim 11, further comprising:
detecting a location of the vehicle and measuring a time at which the location is detected; and
detecting information on a door lock state of the vehicle,
wherein the determining whether the accident has occurred in the vehicle further includes determining that the accident has occurred in the vehicle when a first location of the vehicle detected at a first time is equal to a second location of the vehicle detected at a second time, and door lock release information about the vehicle is not detected for a time interval between the first time and the second time.

* * * * *